(12) United States Patent
Nelson

(10) Patent No.: US 9,643,632 B2
(45) Date of Patent: May 9, 2017

(54) PORTABLE UTILITY CART

(71) Applicant: Wanda Nelson, Lakeland, FL (US)

(72) Inventor: Wanda Nelson, Lakeland, FL (US)

(*) Notice: Subject to any disclaimer, the term of this patent is extended or adjusted under 35 U.S.C. 154(b) by 0 days.

(21) Appl. No.: 14/683,785

(22) Filed: Apr. 10, 2015

(65) Prior Publication Data

US 2015/0291196 A1    Oct. 15, 2015

Related U.S. Application Data

(60) Provisional application No. 61/995,553, filed on Apr. 14, 2014.

(51) Int. Cl.
*B62B 3/02* (2006.01)
*A47B 31/00* (2006.01)
*B62B 5/06* (2006.01)

(52) U.S. Cl.
CPC ............... *B62B 3/02* (2013.01); *B62B 5/061* (2013.01); *B62B 2206/02* (2013.01)

(58) Field of Classification Search
CPC ............ A47B 1/02; A47B 1/08; A47B 2031/003–2031/005; A47B 46/00; B62B 3/00; B62B 3/02; B62B 3/002; B62B 3/004
USPC .................. 108/29, 158.11, 158.12, 90, 149
See application file for complete search history.

(56) References Cited

U.S. PATENT DOCUMENTS

| | | | | |
|---|---|---|---|---|
| 433,032 A * | 7/1890 | Rawlings | ............... | A47B 61/00 108/29 |
| 913,204 A * | 2/1909 | Dickson | ................... | A47B 1/02 108/83 |
| 1,390,123 A * | 9/1921 | Gilkey | ..................... | B62B 3/02 280/35 |
| 1,563,057 A * | 11/1925 | Williams | ................ | B62B 3/006 211/134 |
| 2,572,333 A * | 10/1951 | Greitzer | .................... | A47B 1/05 108/90 |
| 4,155,126 A * | 5/1979 | Classen | .................. | A61G 5/006 297/153 |
| 4,302,023 A * | 11/1981 | Kiesz | ........................ | B62B 3/02 108/106 |
| 4,915,329 A * | 4/1990 | Doninger | ................ | B62B 3/106 248/129 |
| 5,033,755 A * | 7/1991 | Lichtwardt | .......... | A63B 67/002 108/158.11 |
| 5,816,604 A * | 10/1998 | Hsieh | ........................ | B62B 3/02 280/33.997 |
| 6,003,202 A * | 12/1999 | Dauterive | .............. | A47B 95/02 16/419 |
| 6,131,941 A * | 10/2000 | Huang | .................... | A47B 31/04 280/47.35 |
| 6,206,385 B1 * | 3/2001 | Kern | ........................ | B62B 3/02 280/47.35 |

(Continued)

*Primary Examiner* — J. Allen Shriver, II
*Assistant Examiner* — Travis Coolman
(74) *Attorney, Agent, or Firm* — Jason T. Daniel, Esq.; Daniel Law Offices, P.A.

(57) ABSTRACT

A portable utility cart includes a main body having four wheeled corner posts that transition to handles along their top ends. An expandable shelf frame is suspended between the four corner posts, and two fixed shelf members that are positioned onto the expandable frame. One or more removable shelf members are positionable between the fixed shelf members, so as to extend the length of the cart.

1 Claim, 4 Drawing Sheets

(56) References Cited

U.S. PATENT DOCUMENTS

| | | | | |
|---|---|---|---|---|
| 6,401,945 B1* | 6/2002 | Gawel | ................... | A47F 5/0043 |
| | | | | 108/90 |
| 6,691,879 B1* | 2/2004 | Alvarez | ................... | B62B 3/02 |
| | | | | 211/175 |
| 7,661,374 B2* | 2/2010 | Mullen, III | .............. | A47B 1/02 |
| | | | | 108/157.15 |
| 8,006,996 B1* | 8/2011 | Johnston | ................ | B62B 3/008 |
| | | | | 280/651 |
| 2007/0039129 A1* | 2/2007 | Dahl | ....................... | B60B 3/001 |
| | | | | 16/38 |
| 2015/0225005 A1* | 8/2015 | Chen | ......................... | B62B 3/02 |
| | | | | 280/42 |

* cited by examiner

PORTABLE UTILITY CART

CROSS-REFERENCE TO RELATED APPLICATIONS

This application claims the benefit of U.S. Application Ser. No. 61/995,553 filed on Apr. 14, 2014, the contents of which are incorporated herein by reference.

TECHNICAL FIELD

The present invention relates generally to portable workstations, and more particularly to a portable utility cart having an adjustable length shelf system.

BACKGROUND

The statements in this section merely provide background information related to the present disclosure and may not constitute prior art.

There are many types of wheeled carts that are designed for a specific use or industry. Several of the most common types of wheeled carts include those for shopping, golf and gardening, for example. In this regard, each of these carts is designed for a specific purpose and cannot be conveniently used for other purposes. For this reason, there are also several known utility carts which most commonly include a plurality of fixed and vertically aligned shelves that are supported on a wheeled platform. These carts are typically constructed from lightweight plastic, in order to be shipped at low cost and assembled by the end user.

Although useful for lightweight jobs, these utility carts are not recommended for use with heavy and/or bulky items, as their lightweight construction causes the carts to become extremely unstable when in motion. Additionally, there is no way for a user to adjust the size and/or carrying capacity of a traditional utility cart. In this regard, it would be more beneficial for a user to have a generally small cart while performing some jobs, while in other instances a larger cart would be more appropriate.

Accordingly, it would be beneficial to provide a portable utility cart having an adjustable length shelf system that can allow a user to change the size of the cart to suit their particular needs.

SUMMARY OF THE INVENTION

The present invention is directed to a portable utility cart. One embodiment of the present invention can include a main body having four wheeled corner posts that transition to handles along their top ends. An expandable shelf frame is suspended between the four corner posts, and two fixed shelf members that are positioned onto the expandable frame. The expandable frame functions to connect the first and second fixed shelf members together when the cart is contracted, and to separate the fixed shelf members when extended.

In another embodiment, the cart also includes one or more removable shelf members each having a shape and size that is complementary to the fixed shelf members. When the cart is in the extended configuration, each of the removable shelf members can be positioned between the fixed shelf members.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
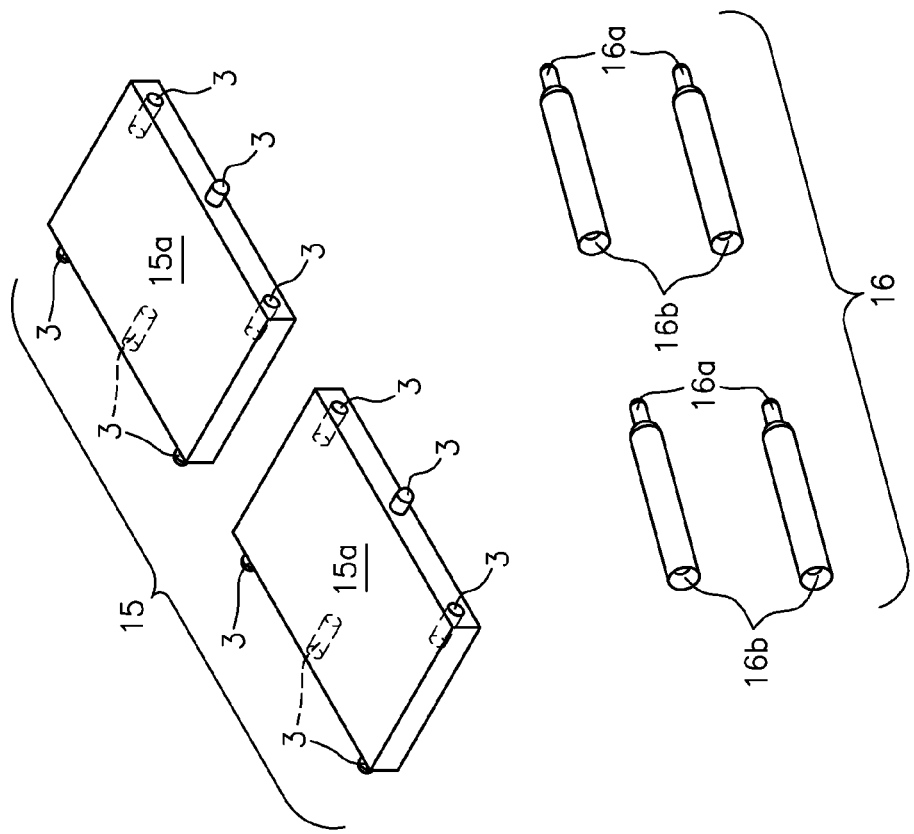
FIG. 1 is a perspective view of the portable utility cart that is useful for understanding the inventive concepts disclosed herein.
Figure 1:
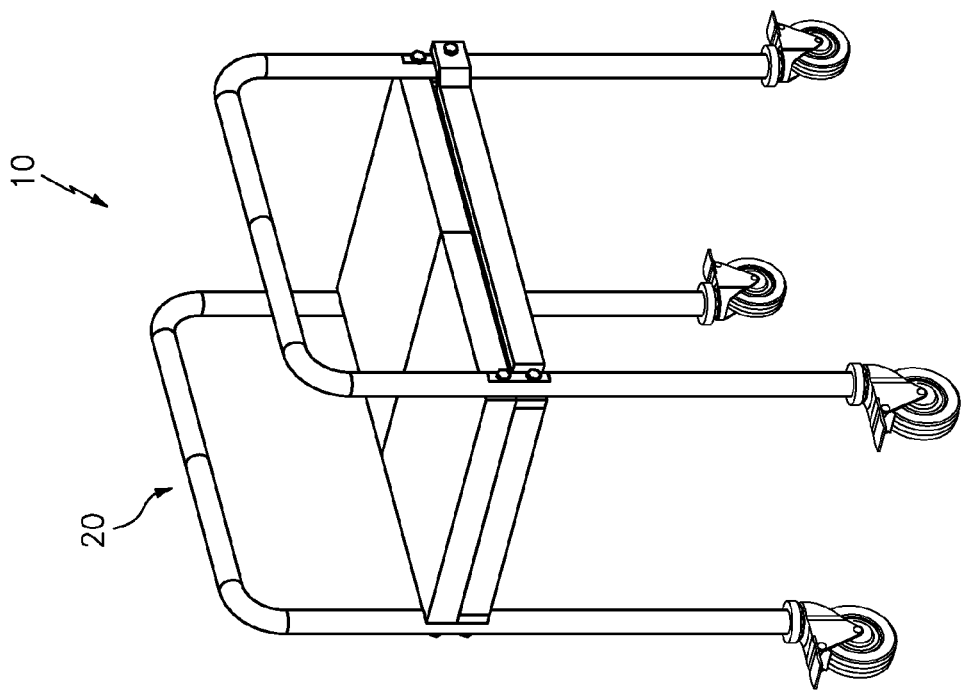

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

As described herein, the terms "connector," "complementary connector" and derivatives thereof can include any number of different elements capable of repeatedly securing two items together in a nonpermanent manner. Several nonlimiting examples include opposing strips of hook and loop material (i.e. Velcro®), magnetic elements, complementary positioned dowels and openings, and/or compression fittings such as hooks, snaps and buttons, for example. Each illustrated connector can be permanently secured to the illustrated portion of the device via a permanent sealer such as glue, adhesive tape, or stitching, for example.

Identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

FIG. 1 illustrates one embodiment of a portable utility cart 10 in a contracted configuration that is useful for understanding the inventive concepts disclosed herein. As shown, the cart 10 can include, essentially, one or more removable shelf members 15, a main body 20, and a plurality of handle extenders 16.

In one embodiment, each of the removable shelf members 15 can include an elongated, generally rectangular member having a plurality of side surfaces and a generally planar top surface 15a.

The removable shelf members will preferably include a shape and size that is complementary to the fixed shelf members, however any number of different shapes and sizes are also contemplated. In this regard, it is preferred that the removable shelf members be constructed from a sturdy material such as wood or metal, however other materials such as plastic and composites are also contemplated. As will be described below, the shelf members can function to allow the length of the cart to be extended.

Figure 2:
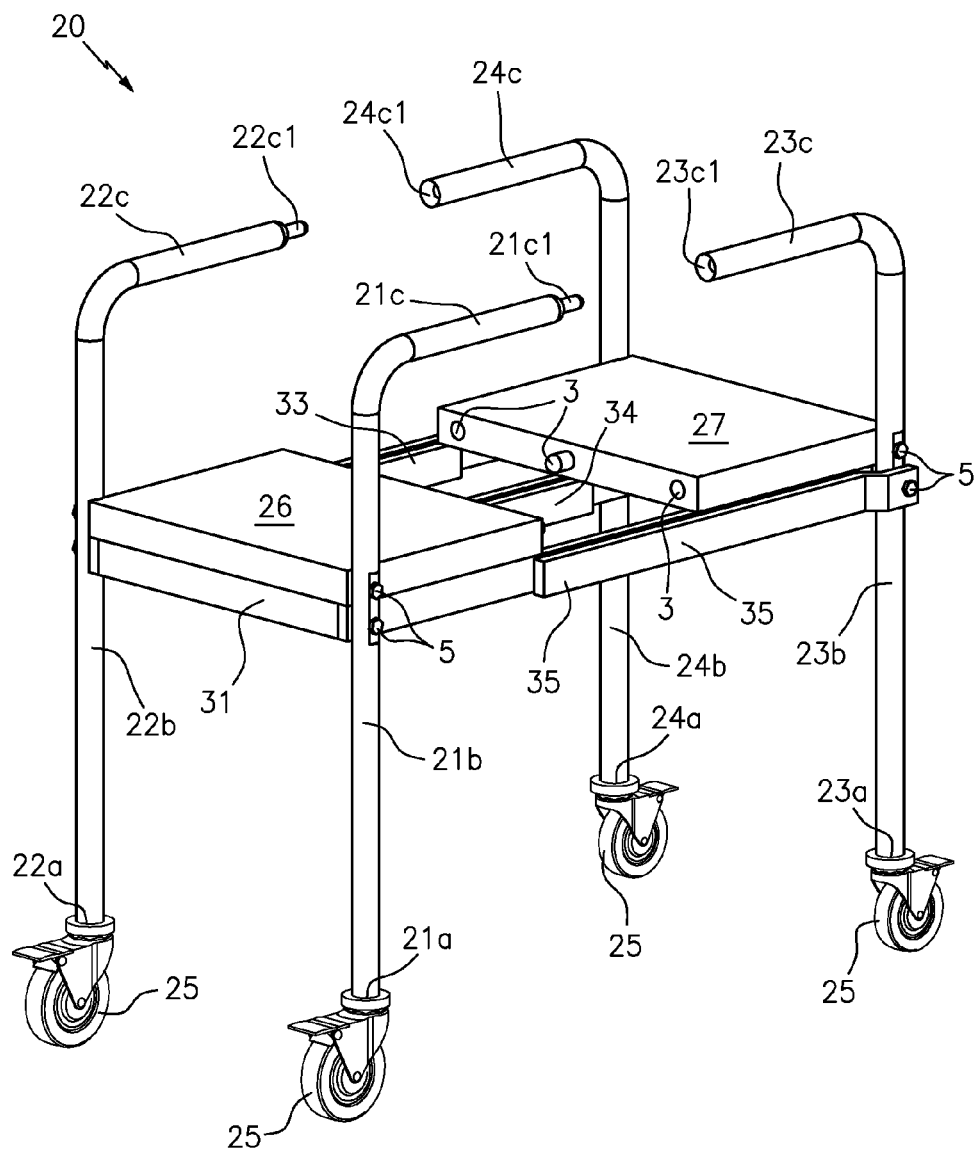
FIG. 2 is a perspective view of the main frame of the portable utility cart in an extended configuration, in accordance with one embodiment of the invention.

As shown best in FIG. 2, the main body 20 can expand and contract so as to receive one or more of the removable shelf members 15. In this regard, the main body can include four vertical posts 21, 22, 23 and 24, that are arranged along the corners of the cart. Each of the vertical posts including a bottom end 21a, 22a, 23a, 24a, an elongated middle section 21b, 22b, 23b and 24b, and a top end 21c, 22c, 23c and 24c that is curved approximately 90 degrees relative to the middle section, so as to form a handle.

The handle sections are designed to engage one another when the cart is in the contracted configuration. As such, the handle sections 21c and 22c can preferably include tapered ends 21c1 and 22c1, respectively. Likewise, handle sections 23c and 24c can preferably include non-tapered end having openings 23c1 and 24c1, respectively. Such a feature, allows handle sections 21c-23c, and 22c-24c to engage one another wherein the tapered end of one handle section is slidingly positioned within the opening of the other handle section.

A plurality of wheel members 25 can be connected to the bottom end of each of the vertical posts 21-24. Each of these wheel members can preferably comprise medium to heavy duty metallic bodied casters. These casters can be the swivel-type or a combination of swivel and fixed orientation. Of course, any number of other known mechanisms capable of allowing the cart to roll in a controlled manner are also contemplated.

As described herein, the posts 21-24 can preferably be constructed from a sturdy material such as powder coated steel or aluminum, for example, however other lightweight materials such as PVC, wood and/or composite materials are also contemplated.

Figure 3:
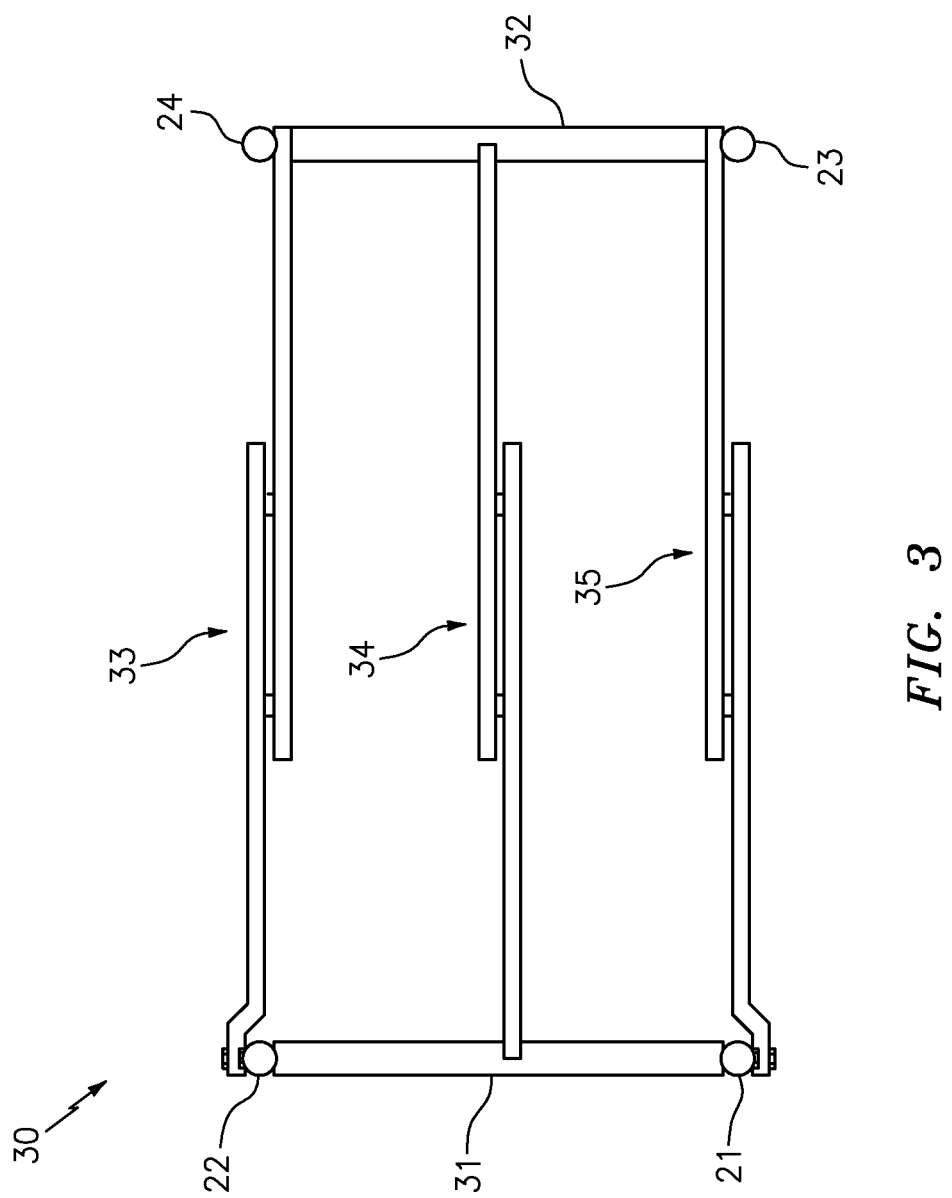
FIG. 3 is a top view of the extension frame of the portable utility cart, in accordance with one embodiment of the invention.

FIG. 3 is a top view of the main body wherein the upper and lower portions of the vertical posts 21-24, and the shelf members 26-27 are removed for ease of illustration. As shown, the main body can include an expandable shelf frame 30 having first and second side rails 31 and 32 that are securely affixed to posts 21-22, and 23-24, respectively, via connectors 5 such as screws or nuts and bolts, for example. Three extension members 33, 34 and 35 can be suspended between first and second side rails. The extension members functioning to expand and contract linearly, so as to allow a user to adjust the length of the device. One example of a suitable extension member includes the commercially available trestle table slide item no 29660 from Rockler®. Of course any number of other known devices that are capable of expanding and contracting in a linear manner are also contemplated.

First and second shelf members 26 and 27 are secured onto the top surfaces of the extension members 33-35 and/or onto the middle sections of the posts 21-24. In this regard, when the cart is in a contracted state (FIG. 1) shelf members 26 and 27 are joined along a common edge. Conversely, when the cart is in the extended state (FIG. 2) the shelf members 26 and 27 are separated. In this regard, when the cart is in the extended state one or more of the removable shelves 15 can be positioned onto the extension members 33-35, so as to be aligned and joined with the fixed shelf members 26 and 27. As such, shelf members 26, 27 and/or 15 can each include any number of shelf connectors 3 so as to allow each shelf member to engage an adjacent shelf member, thereby creating a solid surface onto which a user can deposit items.

Figure 4:
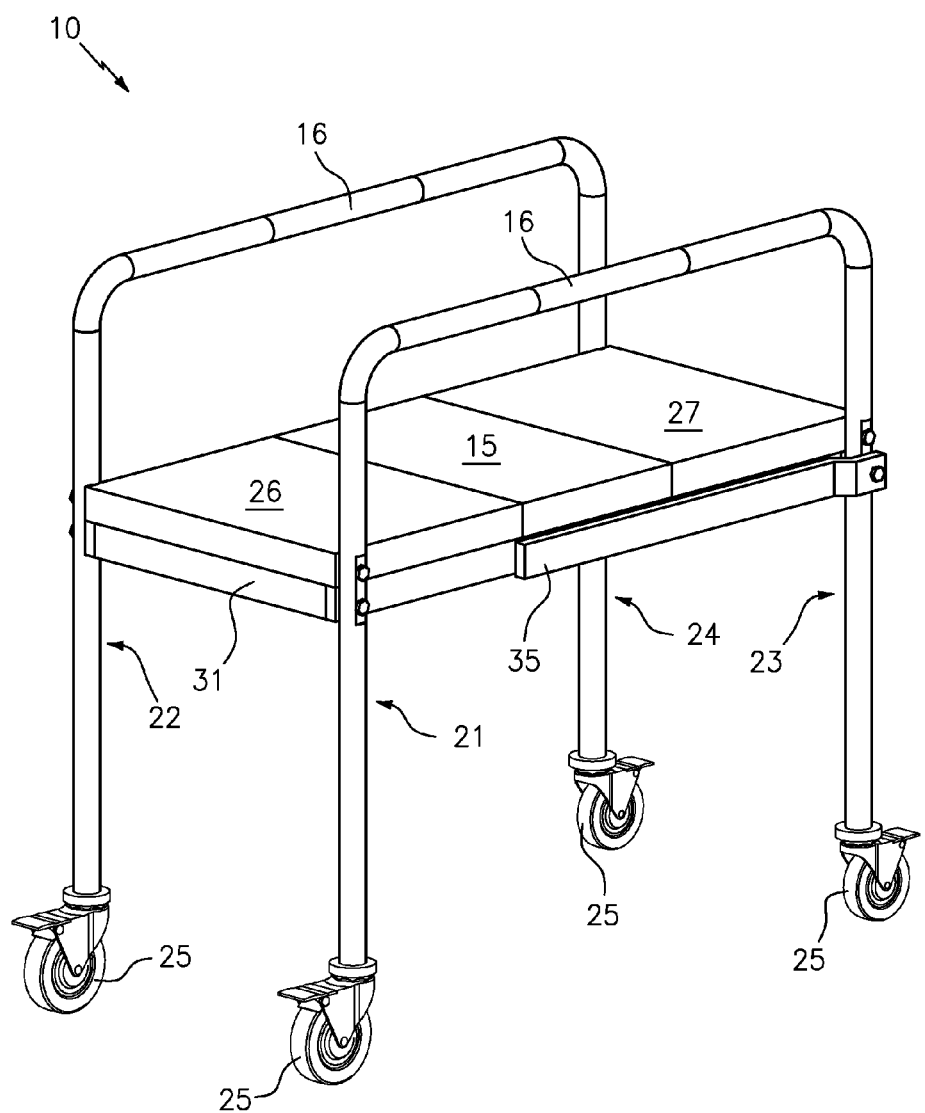
FIG. 4 is a perspective view of the portable utility cart in an elongated configuration, in accordance with one embodiment of the invention.

FIG. 4 illustrates one embodiment of the cart 10 in an elongated configuration wherein at least one removable extension shelf 15 is positioned between the fixed shelves 26 and 27. In the illustrated embodiment, a pair of handle extenders 16 are interposed between the handle sections 21c-23c, and 22c-24c, respectively, so as to provide a single, elongated handle that extends along the length of the cart. Each of the handle extenders will preferably be constructed from an identical construction material as the posts 21-24, and will also include a tapered end 16a and a non-tapered opening 16b having complementary dimensions to the handle sections.

Accordingly, a portable utility cart which can extend and contract so as to receive one or more removable shelves, functions to allow users to quickly and easily change the size of the cart to suit a particular project or work location.

As described herein, one or more elements of the cart 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one continuous element, either through manufacturing processes, such as welding, casting, or molding, or through the use of a singular piece of material milled or machined with the aforementioned components forming identifiable sections thereof.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A portable utility cart, consisting of:
a main body that includes
four corner posts, each of the posts having a bottom end, a middle section, and a curved top end forming a handle section,
a plurality of wheel members that are disposed along the bottom end of the four corner posts,
an expandable shelf frame that is in communication with each of the four corner posts, and
first and second fixed shelf members that are in communication with the expandable shelf frame,
wherein each of the handle sections are located above the first and second fixed shelf members, and are aligned along an adjustable length of the cart, and
the expandable shelf frame functions to connect the first and second fixed shelf members together when the cart is in a contracted configuration, and to separate the first and second fixed shelf members when the cart is in an extended configuration;
one or more removable shelf members that are positionable between the first and second fixed shelf members when the cart is in the extended configuration; and
a plurality of handle extenders, each of said extenders functioning to engage the handle sections of two of the corner posts when the cart is in the extended configuration, so as to form two elongated handles along the adjustable length of the cart.

* * * * *